US007251611B2

(12) United States Patent
Abbott et al.

(10) Patent No.: US 7,251,611 B2
(45) Date of Patent: Jul. 31, 2007

(54) METHOD AND SYSTEM FOR DETERMINING AN ECONOMICALLY OPTIMAL DISMANTLING OF MACHINES

(75) Inventors: Steve Abbott, Wellesley, MA (US); William E. Dickey, Wappingers Falls, NY (US); William F. Holden, Jr., Shell Lake, WI (US); Larry M. Leibovich, Rochester, MN (US); Joseph V. Stehle, Trafford, PA (US); Ronald A. Warfel, Duncannon, PA (US); Yung-Joon Lee, Cambridge, MA (US); Kevin P. O'Connor, Hyde Park, NY (US); Pitipong Veerakamolmal, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 09/808,067

(22) Filed: Mar. 14, 2001

(65) Prior Publication Data

US 2004/0236641 A1   Nov. 25, 2004

(51) Int. Cl.
*G06F 9/44* (2006.01)
(52) U.S. Cl. ...................................................... 705/7
(58) Field of Classification Search .................. None
See application file for complete search history.

(56) References Cited

U.S. PATENT DOCUMENTS 5,630,070 A   5/1997   Dietrich et al. ............. 395/208
5,918,051 A   6/1999   Savitzky et al. ............ 395/683
5,965,858 A * 10/1999   Suzuki et al. ............... 235/375
5,971,585 A   10/1999   Dangat et al. ........... 364/468.08
6,061,750 A   5/2000   Beardsley et al. ............ 710/74

(Continued)

FOREIGN PATENT DOCUMENTS

JP   2002-230087   *   8/2002

OTHER PUBLICATIONS

Bras et al., The Use of Activity-Based Costing, Uncertainty and Disassembly Action Charts in Demanufacture Cost Assessments Sep. 1995 AMSE Advances in Design Automation Conference.*

(Continued)

*Primary Examiner*—Romain Jeanty
*Assistant Examiner*—Scott L. Jarrett
(74) *Attorney, Agent, or Firm*—Gibb & Rahman, LLC; Derek S. Jennings

(57) ABSTRACT

An economic supply optimization system is provided whereby an optimal machine dismantling configuration of a machine supply is determined to meet a parts demand at a lowest cost. The parts supply is calculated and it is determined what portions of the demand cannot be met from the machine supply and what portions of the demand it is not economically justifiable to meet from the machine supply. A parts supply is then determined from the machine supply. The remaining parts demand is matched to the parts supply to create a list of parts covered by the parts supply and a list of parts not covered by the parts supply, if there are any. The optimal dismantling configuration of the machine supply is calculated for the covered parts list and an optimal harvesting configuration is calculated for the not-covered parts list.

76 Claims, 8 Drawing Sheets

U.S. PATENT DOCUMENTS

| | | | |
|---|---|---|---|
| 6,085,493 | A | 7/2000 | DeBusk et al. ............... 53/445 |
| 6,141,708 | A | 10/2000 | Tavallaei et al. .............. 710/62 |
| 6,159,411 | A | 12/2000 | Kulkarni et al. ............ 264/401 |
| 6,321,983 | B1 * | 11/2001 | Katayanagi et al. ........ 235/380 |
| 6,529,788 | B1 * | 3/2003 | Tani et al. ..................... 700/97 |
| 6,633,795 | B1 * | 10/2003 | Suzuki et al. ............... 700/213 |
| 6,732,417 | B2 * | 5/2004 | Kaburagi et al. ........ 29/407.01 |
| 6,856,857 | B2 * | 2/2005 | Tateishi et al. ............. 700/213 |
| 7,054,824 | B1 * | 5/2006 | Grenchus et al. .............. 705/7 |

OTHER PUBLICATIONS

Klausner, Markus et al., Reverse-logistics for product take-back Interfaces, May/Jun. 2000, vol. 30, No. 3, pp. 156-165.*

Boswell, C.J., A Feedback Strategy for Closed Loop End-Of-Life Cycle Process International Conference on Clean Electronics, Conference Publication 415, Oct. 1995, pp. 142-147.*

Srinivasan, N. et al., A framework for virtual disassembly analysis Journal of Intelligent Manufacturing, Aug. 1997, vol. 8, No. 4, pp. 277-295.*

Hoshino, T et al., Optimization Analysis for recycle-oriented manufacturing systems International Journal of Production Research, 1995, vol. 33, No. 8, pp. 2069-2078.*

Limaye, Ketain et al., System Simulation and Modeling of Electronics Demanufacturing Facilities Electronics and the Environment, 1999. Proceedings of the 1999 IEEE International Symposium on May 11-13, 1999 pp. 238-243.*

Jayaraman et al., A closed-loop logistics model for remanufacturing Journal of Operational Research Society, 1999, vol. 50, pp. 497-508.*

Erwin van der Laan et al., Inventory Control in Hybrid Systems with Remanufacturing Management Science, May 1999, vol. 45, No. 5, pp. 733-747.*

Grenchus, Ed et al., Composition and Value of Returned Consumer and Industrial Information Technology Equipment Electronics and the Environment, 2000. ISEE 2000. Proceedings of the 2000 IEEE International Symposium May 8-10, 2000 pp. 324-329.*

Grenchus, Ed, Demanufacturing of Information Technology Equipment Electronics and the Environment, 1997. ISEE-1997., Proceedings of the 1997 IEEE International Symposium on May 5-7, 1997 pp. 157-160.*

Di Marco, Patrick et al., Compatibility Analysis of Product Design For Recyclability and Reuse ASME Computers in Engineering Conference, Feb. 1994.*

Jung, Leah, The Conundrum of Computer Recycling Retrieved from Vista.simplenet.com/conundrum.html, Oct. 8, 1999.*

Louis, Brennan et al., Operations planning issues in an assembly/disassembly environment International Journal of Operations & Production, vol. 1,4 No. 9, 1994.*

Taleb, Karim Nazih, Operational issues in disassembly Northeastern University, 1995, AAT 9532566, Abstract.*

Goan, Meng-Jong, An integrated approach to environmentally-conscious design and manufacturing Virginia Polytechnic Institute and State University, AAT 9638608, Abstract, 1996.*

Jayaraman V. et al., A closed-loop logistics model for remanufacturing Journal of the Operational Research Society, vol. 50, 1999, pp. 497-508.*

2000 IEEE International Symposium on Electronics and the Environment—Agenda, 2000.*

Dietrich, Brenda et al., Big Benefits for Big Blue OR/MS Today, Jun. 2000.*

Veerakamolmal, P. and Gupta, S., Optimizing the Suppy Chain in Reverse Logistics 2000 IEEE International Symposium on Electronics and the Enviroment.*

Gupta, Surendra and Verrakamolmal, P., A Bi-directional Supply Chain Optimization Model for Reverse Logistics 2000 IEEE International Symposium on Electronics and the Environment.*

Kasmara, Andre et al., Production planning in remanufacturing/manufacturing production system IEEE, 2001.*

Veerakamolmal, Pitipong, Design and Analysis of Disassembly and Remanufacturing Systems in the Electronics Industry Doctorial Thesis, Northeastern University, UMI 9937438, Jun. 1999.* van der Laan, Erwin et al., Production planning and inventory control with remanufacturing and disposal European Journal of Operational Research, 1997, pp. 264-278.*

Meacham, Anu et al., Optimal Disassembly Configurations for Single and Multiple Products Journal of Manufacturing Systems, vol. 18, No. 5, 1999, pp. 311-322.*

Daniel, V. et al., Production planning and control for remanufacturing: industry practice and research needs Journal of Operations Management, vol. 18, 2000, pp. 467-483.*

Tang, Y., et al., "Integrated Approach to Disassembly Planning and Demanufacturing Operation," IEEE International Symposium on Electronics and the Environment, San Francisco, May 8-10, 2000, Processings of ISEE 2000, pp. 354-359.

Mok, S.M. et al., "System for Analyzing Automatic Assembly and Disassembly Operations," IEEE International Conference on Robotics and Automation, San Francisco, Apr. 24-28, 2000, Symposia Proceedings, 2000, 2000 ICRA Millemiun Conference, vol. 4 pp. 3695-3700.

Limaye, K. Et al., "System Simulation and Modeling of Electronics Demanufacturing Facilities," IEEE International Symposium on electronics and the Environment, Danvers, MA, May 11-13, 1999, Processings of ISEE 1999, pp. 238-243.

Srinivasan, H. et al., "Framework for Virtual Disassembly Analysis," J. Of Intelligent Manufacturing, vol. 8, Issue 4, Aug. 1997, pp. 277-295.

Kalyan Seshu, U.S., et al., "Towards Computer Aided Design for the Life Cycle," IEEE International Symposium on electronics and the Environment, Oak Brook, IL., May 4-6, 1998, pp. 31-315.

Tai-Yue Wang et al., "Machine Selection in Flexible Manufacturing Cell: a Fuzzy Multiple Attribute Decision-Making Approach," International J. Of Production Research, vol. 38, Issue 9, Jun. 15, 2000, pp. 2079-2097.

Fasano et al., "Optimizing Reverse Logistics Scenarios: A Cost-Benefit Study Using IBM's WIT Tool", Proceedings of the 2002 IEEE Symposium on Electronics and the Environment, 2002.

Veerakamolmal et al., "Cost-benefit Study of Consumer Product Take-back Programs Using IBM's WIT Reverse Logistics Optimization Tool", Proceedings of the SPIE International Conference on Environmentally Conscious Manufacturing (vol. 4569), 157-166, 2001.

IBM Watson Implosion Technology Release 6.0, User's Guide and Reference, Apr. 17, 2006-Draft Document, Second Editon (Mar. 2000), 410 pages total.

Gutpa, et al., "An Optimization Approach for A Reverse Logistics Supply Chain," Proceedings of the International Group Technology and Cellular Manufacturing Conference, 2000, pp. 1-6.

Veerakamolmal, P., "Design and Analysis of Disassembly and Remanufacturing Systems in the Electronics Industry," UMI Microform 9937438, Copyright 1999, Jun. 1999, pp. 1-118.

Gupta, et al., "Disassembly of Products," NIST Systems Integration for Manufacturing Application Program, Grant No. 60NANB5D0112, Final Report, Dec. 1996, pp. 1-195.

Gupta, et al., "Profitability Measure for Product Disassembly and Recycling," Proceedings of the 1998 Production and Operations Management Society Conference, Jun. 1998, pp. 139-147.

Gupta, et al., "A Case-Based Reasoning Approach for the Optimal Planning of Disassembly Processes," Proceedings of the Second International Seminar on Reuse, Mar. 1-3, pp. 141-150.

Gupta, et al., "Environmental Issues: Reuse and Recycling in Manufacturing Systems," May 28, 1998, pp. 1-17.

Gupta, et al., "Definitions for (Article #1351) Environmental Issues: Reuse and Recycling in manufacturing Systems," Encyclopedia of Production and Manufacturing Management, Aug. 10, 1998, pp. 1-5.

Veerakamolmal, et al, "Design of an Integrated Component Recovery System," Proceedings of the 1998 IEEE International Symposium on Electronics and the Environment, May 4-6, pp. 264-269.

Veerakamolmal, et al, "High-mix/Low-volume Batch of Electronic Equipment Disassembly," Computers and Industrial Engineering, col. 35(1-2), pp. 65-68.

Veerakamolmal, et al., "Optimal Analysis of Lot-Size Balancing for Multiproducts Selective Disassembly," International Journal of Flexible Automation and Integrated Manufacturing, vol. 6(3&4), 1998, pp. 245-269.

Veerakamolmal, et al., "Planning Components Recovery from Multiple Products," Proceedings of the 1998 Northeast Decision Sciences Institute Conference, Mar. 25-27, pp. 270-272.

Veerakamolmal, et al., "A Combinatorial Cost-Benefit Analysis Methodology for Designing Modular Electronic Products for the Environment,," Proceedings of the 1999 IEEE International Symposium on Electronics and the Environment, May 11-13, 6 pages.

Veerakamolmal, et al., "Automating Multiple Products Disassembly Process Planning with Case-Based Reasoning," Proceedings of the Second International Conference on Operations and Quantitative Management, Jan. 3-6, pp. 24-33.

Veerakamolmal, et al., "Designing Electronic Products for Disassembly Using Cont/Benefit Analysis," Proceedings of the 1999 Annual Meeting of the Northeast Decision Sciences Institute, Mar. 24-26, pp. 189-191.

Veerakamolmal, et al., "Reuseable-Component Requirements Planning for the Integrated Remanufacturing System," Proceedings of the 25th International Conference on Computers and Industrial Engineering, Mar. 29-Apr. 1, pp. 58-61.

Veerakamolmal, et al., "Disassembly Process Planning," Engineering Design and Automation, Mar. 18, 1997, pp. 1-26.

Veerakamolmal, et al., "Analysis of Design Efficiency for th eDisassembly of Modular Electronic Products," Journal of Electronics Manuafacturing, vol. 9, No. 1, Mar. 1999, pp. 79-95.

Veerakamolmal, et al., "Disassembly," Industrial Engineering Encyclopedia, 6 pages.

Veerakamolmal, et al., "Disassembly Process Planning," International Conference on Engineering Design and Automation, Mar. 18-21, 4 pages.

* cited by examiner

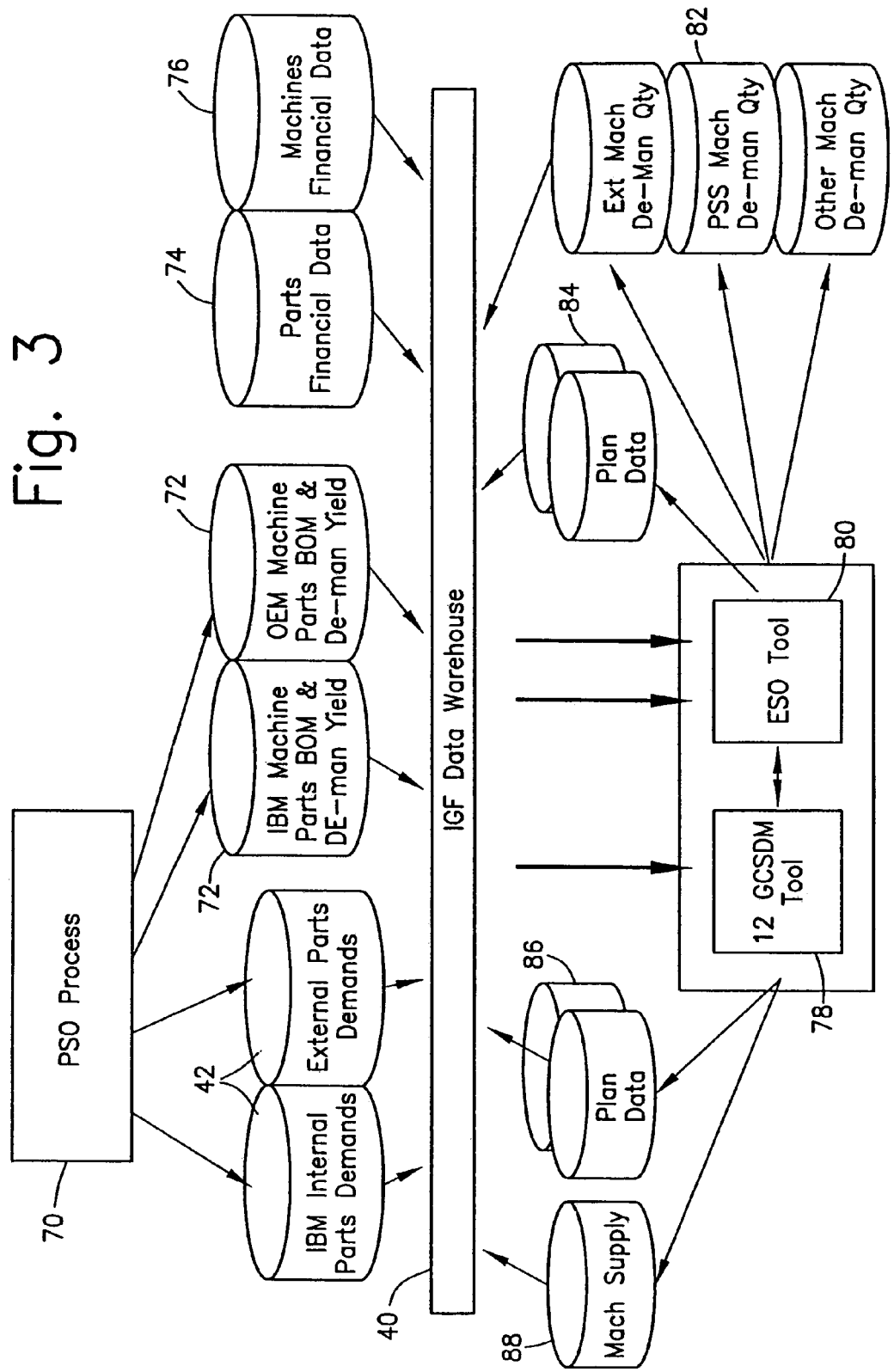

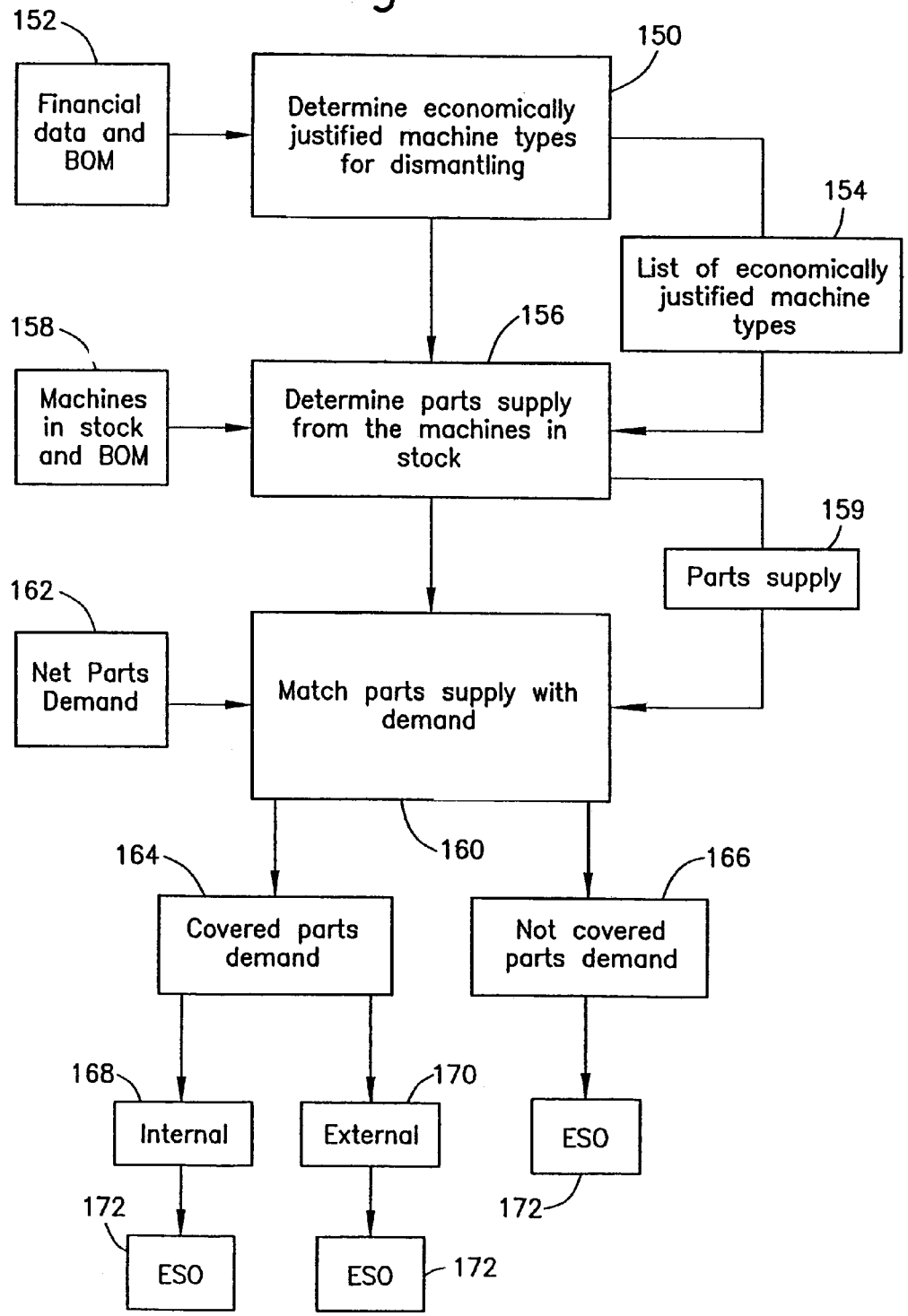

METHOD AND SYSTEM FOR DETERMINING AN ECONOMICALLY OPTIMAL DISMANTLING OF MACHINES

FIELD OF THE INVENTION

The present invention relates to supply optimization, and more particularly, to an end-of-lease (EOL) equipment supply optimization system.

BACKGROUND OF THE INVENTION

Typically, businesses lease high cost equipment rather than purchasing the equipment outright. Leasing may be obtained from a financial institution that has purchased the equipment or from the original equipment manufacturer. When equipment is leased from a financial institution, it is typically sold off at the end of a lease (EOL) for the fair market value of the equipment. When equipment is leased from a manufacturer, however, it may be more profitable for the manufacturer to break down, or de-manufacture, EOL machinery and sell the individual parts of the machine separately. Selling the equipment as a whole, however, may be more profitable. As a third alternative, some combination of both options may yield the highest profit, which is typically the case. The exact combination of machine sales to parts sales to maximize profit, however, is difficult to calculate.

Thus, it is desirable to provide a system for determining the most profitable solution for EOL equipment disposal and thereby use returned EOL equipment to maximize value to the leasing entity.

SUMMARY OF THE INVENTION

A method for optimizing a machine supply to meet a parts demand at a lowest cost is provided comprising the steps of determining a parts demand, determining a machine supply, and configuring an optimal dismantling configuration of the machine supply to meet the parts demand at a lowest cost by considering a number of variables such as machine parts yield, probable quality of machine yielded parts, machine inventory, forecasted machine returns, fair market values of machines and parts, de-manufacturing cost, de-manufacturing cycle times and parts refurbishing cycle times. The optimal dismantling configuration includes a predetermined number and a predetermined type of machines from the machine supply.

The method further comprises determining a portion of the parts demand that cannot be satisfied from the machine supply, determining which machines in the machine supply are economically justified for dismantling, determining the parts supply yielded from the machine supply and matching the parts supply to the parts demand. If the parts supply is insufficient to meet the parts demand, a covered list outlining the parts demand that is covered by the supply and a not-covered list outlining the parts demand that is not covered by the supply is generated. An optimal dismantling configuration of the machine supply for the covered list is calculated and an optimal harvesting configuration (obtaining machines from other sources) is calculated for the not-covered list.

An economic supply optimization system is also provided to determine how to dismantle a machine supply to collect specific parts for meeting a parts demand at a lowest cost. The system comprises a processor, a first data storage device connected to the processor, and a program residing on the data storage device executable by the processor. A second data storage device provides central data storage for the system and stores information on parts demand, parts supply, relevant financial information, and technical information on de-manufacturing. The program determines a parts demand and a machine supply. An optimal dismantling configuration of the machine supply to satisfy the parts demand at a lowest cost is then determined. In this manner, the parts demand is converted into a machine-to-dismantle demand while minimizing the cost incurred by meeting the parts demand.

The system accepts, as input, information on parts demand, machine supply, financial information on market values and de-manufacturing costs, technical information on de-manufacturing and other supply-demand matching information. Preferably, the information is maintained on the second data storage device to effect central data storage. The system performs a first pre-screening process to identify a portion of the parts demand that cannot be satisfied from the machine supply. A second pre-screening process eliminates the parts demand which it is not economically feasible to satisfy from the machine supply. Selection for elimination is accomplished by a predetermined selection criteria. A parts supply is determined from the remaining machine supply and the parts supply matched to the parts demand. If there is a sufficient supply, the optimization tool determines the optimal dismantling configuration. If there is an insufficient supply, a list of the covered parts and a list of the not-covered parts are generated. The optimal dismantling configuration is then determined by the optimization tool for the covered parts list.

In this manner, reverse logistics and algorithms can be used to match a machine supply to a parts demand at a lowest cost thereby maximizing profit in planning a parts supply from de-manufacturing the machine supply.

BRIEF DESCRIPTION OF THE DRAWINGS

FIG. 3 shows the data flow in a preferred embodiment of the present invention.

FIG. 5 shows a combined data and logic flow according to a preferred embodiment of the present invention

DETAILED DESCRIPTION OF THE PREFERRED EMBODIMENTS

Figure 1:
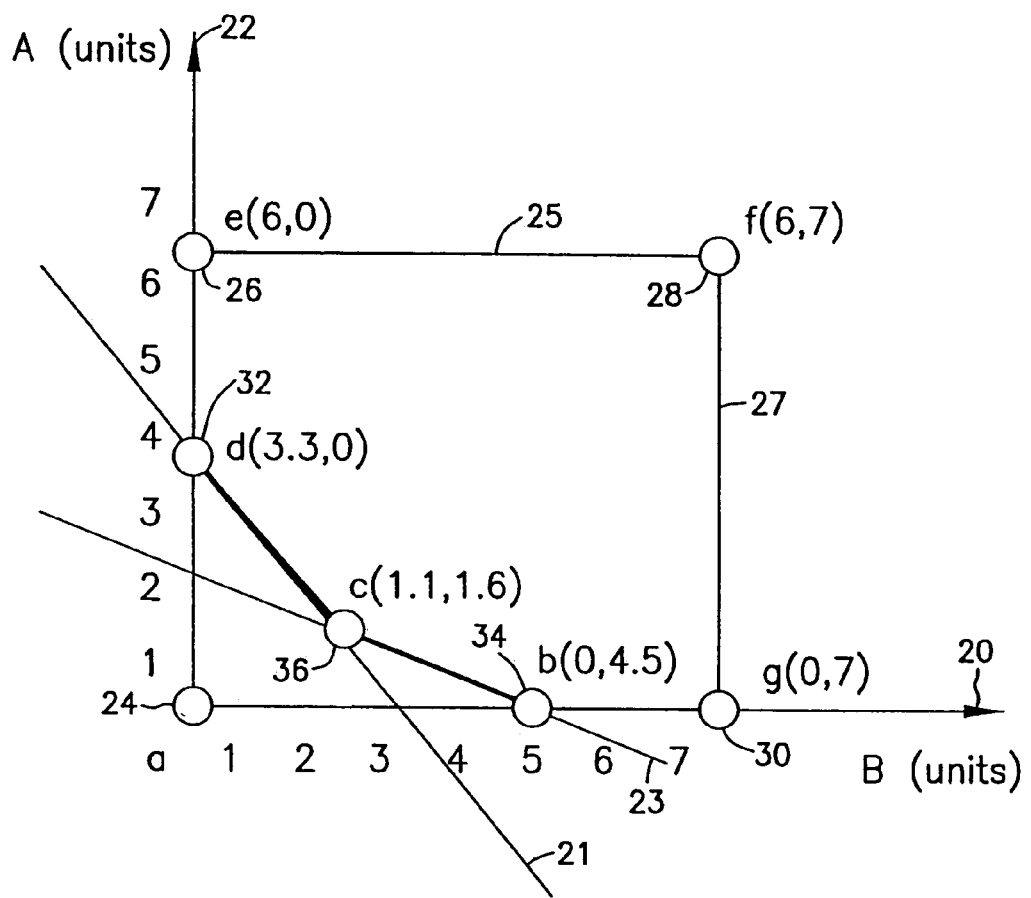
FIG. 1 shows a graph for a Linear Programming formulation according to a preferred embodiment of the present invention.

A system and method for optimizing a machine supply to meet a predetermined parts demand at a lowest cost is provided. A simple example follows.

Referring to Table 1 below, assume there are 6 units of machine A and 7 units of machine B returning from a lease. There is a demand for 9 units of part x and 10 units of part z. Machine A has 5 units of part x, 1 unit of part y and 3 units of part z. Machine B has 2 units of part x, 4 units of part y and 4 units of part z.

TABLE 1

Supply and Demand

| Supply (per units) | | Demand (units) | |
|---|---|---|---|
| A | x  5 | x | 9 |
|   | y  1 | z | 10 |
|   | z  3 |   |   |
| B | x  2 |   |   |
|   | y  4 |   |   |
|   | z  4 |   |   |

In accordance with the present invention, various dismantling configurations are considered to meet the parts demand at the lowest cost. Table 2 lists the solutions and their corresponding dismantling costs. To meet the demand for part x, one A machine and two B machines can be dismantled to yield the demanded 9 parts at a cost of $700. This would also yield 11 z parts, which is sufficient to meet the demand for part z of 10 units. Alternatively, five B machines can be dismantled to yield ten x parts and twenty z parts at a cost of $750. Lastly, four A machines will yield 20 x parts and 12 z parts at a dismantling cost of $1,600.

TABLE 2

Solutions and Costs

| Supply | De-man cost | Units |
|---|---|---|
| A | $400 | 6 |
| B | $150 | 7 |
| Solutions: | | |
| 1 - A × 1 + B × 2 = | $700 | |
| 2 - B × 5 = | $750 | |
| 3 - A × 4 = | $1,600 | |

The first solution is the most cost effective at $700, and therefore, is selected as the optimal dismantling configuration (the type and number of machines to dismantle to meet parts demand at the lowest cost) of the machine supply.

The above was a simplified example to illustrate the principle of the present invention. For more complex problems, a more powerful calculation algorithm is used, such as Linear Programming (LP).

Referring to FIG. 1, there is shown a graph of a linear programming formulation created in accordance with well-known mathematical principles. A graph of n dimensions is used where n is the number of machine types available, which is two in this case, machine A and machine B.

The x-axis 20 represents the number of B units and the y-axis 22 represents the number of A units. The potential sets of machines are plotted on the graph with point a 24 corresponding to zero units of A and zero units of B, point e 26 representing six units of A and zero units of B, point f 28 representing six units of A and seven units of B, and point g 30 representing zero units of A and seven units of B.

Lines are drawn between points e 26 and f 28 (line 25), to represent all possible solutions with six units of A (A=6), and between points f 28 and g 30 (line 27), to represent all possible solution sets with seven units of B (B=7).

Equations are formulated for the demand for part x and the demand for part z. The number of x parts in an A machine (5) multiplied by the number of A machines plus the number of x parts in a B machine (2) multiplied by the number of B machines is set to 9, the demand for x. The formula is represented by $$5A+2B=9$$

The formula is plotted on the graph as line 23. The equation 3A+4B=10, calculated in the same manner, corresponds to the need for 10 units of part z and is represented by line 21. Points are assigned to each intersection of the lines 21, 23 with each other (point c 36) and the axes (points b 34 and d 32) that form a corner within the boundary of the problem which is defined by the lines between points b 34 to g 30 and back to b 34.

The mathematical formula representation for de-manufacturing cost is given by multiplying the cost of de-manufacturing A by the number of units of A, and adding that amount to the cost of de-manufacturing B multiplied by the number of B units de-manufactured. The formula is $$Z=400A+150B$$

where Z is the total de-manufacturing cost, 400 is the cost to de-manufacture one A unit, A is the number of A units to de-manufacture, 150 is the de-manufacturing cost of B and B is the number of B units to de-manufacture. The objective is to minimize cost, or minimize Z.

Points b 34 to g 30 represent the set of potential solutions within the boundary of the problem. Point a 24 at the origin represents dismantling 0 units of A and 0 units of B, which is not a potential solution. Point b (0, 4.5) 34 represents dismantling 0 units of A and 5 units of B because the coordinates are rounded to the nearest integer. Point c (1.1, 1.6) 36 represents dismantling 1 unit of A and 2 units of B. Point d (3.3, 0) 32 represents dismantling 3 units of A and 0 units of B. Point e(6,0) 26 represents dismantling 6 units of A and 0 units of B. Point f(6,7) 28 represents 6 units of A and 7 units of B. Lastly, point g(0,7) 30 represents the solution of dismantling 0 units of A and 7 units of B. Somewhere along the line defined by points b 34, c 36, d 32, e 26, f 28 and g 30 is the optimal configuration for dismantling of the machine supply to meet the parts need. The optimal configuration is found as follows.

Begin at point a (0,0) 24. Find the next adjacent point (b 34 or d 32) that incurs the least cost. In this case, point b 34 representing the dismantling of 5 B machines at a cost of $750 is the lowest cost point adjacent to point a 24. Next, select point b (0, 4.5) 34 and find the next adjacent point to b (c 36 or g 30) that is the most cost effective. Here, point c, which represents solution 1 is less expensive than point g 30 which represents dismantling all seven units of machine B. Now, select point c (1.1,1.6) 36 and find the next cheapest, adjacent point. Point d 32 requires a higher cost than point c 36 (refer to Sol.3 in previous example). Since we cannot achieve any improvement in moving further, point c 36 is the optimal solution. The coordinates of c are rounded off to the nearest integer, namely, 1.1 is rounded to 1 and 1.6 to 2. Therefore, we can dismantle 1 unit of A and 2 units of B, with a minimal cost of $700 to meet the parts demand of 9 units of part x and 10 units of part z.

In a more robust example, the list of optimization variables could include projected parts demand, parts and machine net investment book values (NIB), parts & machines projected wholesale fair market values (FMV), machine de-manufacturing costs, parts repair costs, process cycle lead times for de-manufacture, re-manufacture and parts repair processes and internal company exchange pricing for parts and machines.

A more complex, but still simplified example follows. Table 3 lists information on four available PC models for de-manufacturing and parts retrieval. There are four machine models (PC1, PC2, PC3, PC4) that are made up of various combinations of seventeen different parts. Relevant data for optimization includes the part number, description, parts yield per machine, part value, percentage yield (percentage of total parts that are actually yielded as a result of demanufacture based on historical, statistical data for a particular model), total supply of parts (calculated by cross-referencing the yield per machine with the machine supply), and total demand. The machine supply in stock is: PC1=75, PC2=65, PC3=85, PC4=85 units. Parts 4, 5, 7-10, 13, 14 and 15 are in demand.

$PC_i$=processing cost of de-manufacturing machine i;
$S_i$=total supply of machine i;
$D_j$=netted demand of part j; and
$W_{ij}$=parts not utilized
$X_{ij}$=parts fulfillment
$Y_i$=machines required to fulfill the desired parts The objective is to maximize TRR subject to the following constraints:

$\{Y_i\} \leq \{S_i\}$: the number of machines to be dismantled should not exceed the number of available machines collected from all sources;

$\{X_{ij}\}+\{W_{ij}\}=QP_{ij}\cdot\{(Y_i\cdot I_{ii})\cdot Q_{ij}\}$: machine structure constraint of parts in each machine;

TABLE 3

Information for the four available PC models for de-manufacture and parts retrieval

| Part Number (j) | Description | ($) | Yield-per (Qij) (Parts Yield per) | | | | Value ($) (RVj) | Yield (Percent) (QPj) | Total Supply of Parts # of mach. & yield-per | Total Demand (Dj) |
|---|---|---|---|---|---|---|---|---|---|---|
| | | | PC1 260 | PC2 285 | PC3 300 | PC4 530 | | | | |
| 1 | Housing Assembly (PC1, PC2) | | 1 | 1 | — | — | — | — | 140 | — |
| 2 | Housing Assembly (PC3, PC4) | | — | — | 1 | 1 | — | — | 170 | — |
| 3 | Memory Module, 16 MB, SDRAM | | 2 | — | — | — | — | — | 150 | — |
| 4 | Memory Module, 32 MB, SDRAM | | 2 | 4 | 2 | — | 50 | 100 | 580 | 390 |
| 5 | Memory Module, 64 MB, SDRAM | | — | — | 2 | 4 | 90 | 100 | 510 | 390 |
| 6 | Pentium II 350 MHz CPU and Heat Sink | | 1 | — | — | — | — | — | 75 | — |
| 7 | Pentium II 400 MHz CPU and Heat Sink | | — | 1 | 1 | — | 150 | 100 | 150 | 95 |
| 8 | Pentium II 450 MHz CPU and Heat Sink | | — | — | — | 2 | 180 | 100 | 170 | 150 |
| 9 | Mother Board (PC1, PC2) | | 1 | 1 | — | — | 25 | 70 | 140 | 95 |
| 10 | Mother Board (PC3, PC4) | | — | — | 1 | 1 | 40 | 75 | 170 | 100 |
| 11 | Display and Sound Cards (PC1–PC4) | | 1 | 1 | 1 | 1 | — | — | 310 | — |
| 12 | 4 GB Hard Drive | | 1 | — | — | — | — | — | 75 | — |
| 13 | 9.1 GB Hard Drive | | — | 1 | 2 | — | 65 | 75 | 235 | 140 |
| 14 | 12.6 GB Hard Drive | | — | — | — | 2 | 70 | 75 | 170 | 100 |
| 15 | 1.44-MB Diskette Drive | | 1 | 1 | 1 | 1 | 60 | 80 | 310 | 195 |
| 16 | 32× CD-ROM Drive (PC1–PC4) | | 1 | 1 | 1 | 1 | — | — | 310 | — |
| 17 | Power Supply (PC1–PC4) | | 1 | 1 | 1 | 2 | — | — | 395 | — |

Using a summation formulation to determine profits from the information in the table, optimization may be performed by applying the formula:

Total Resale Net Revenue (TRR) =

$$\sum_i \sum_j (RV_j \cdot \{X_{ij}\}) - \sum_i (TC_i \cdot \{Y_i\}) - \sum_i (PC_i \cdot \{Y_i\})$$

where
$RV_j$=revenue sales from part j sales;
$TC_i$=net investment balance (cost) of machine i;

$\{I_i \cdot X_{ij}\}=\{D_j\}$: the demand for every type of part should be met; and, $\{Y_i\}, \{X_{ij}\}, \{W_{ij}\} \geq 0$: the supply of machines, demand of parts, and the parts recycled and/or disposed of should be non-negative values.

Applying the formula to the information in Table 3 according to well known mathematical principles, the optimal net revenue is TRR*=$14,265, which includes the dismantling of 73, 63, 62 and 75 units of PC models PC1*, PC2*, PC3* AND PC4* respectively. Table 4 shows the results of optimization.

TABLE 4

Demand fulfillment - retrieval of parts from machines.

| Number (j) | Description | Demand Fulfillment (Xij) | | | | |
|---|---|---|---|---|---|---|
| | | PC1 | PC2 | PC3 | PC4 | Total |
| 1 | Housing Assembly (PC1, PC2) | — | — | — | — | — |
| 2 | Housing Assembly (PC3, PC4) | — | — | — | — | — |
| 3 | Memory Module, 16 MB, SDRAM | — | — | — | — | — |
| 4 | Memory Module, 32 MB, SDRAM | 146 | 120 | 124 | — | 390 |
| 5 | Memory Module, 64 MB, SDRAM | — | — | 124 | 266 | 390 |
| 6 | Pentium II 350 MHz CPU and Heat Sink | — | — | — | — | — |
| 7 | Pentium II 400 MHz CPU and Heat Sink | — | 35 | 60 | — | 95 |

TABLE 4-continued

Demand fulfillment - retrieval of parts from machines.

| Number (j) | Description | Demand Fulfillment (Xij) | | | | Total |
|---|---|---|---|---|---|---|
| | | PC1 | PC2 | PC3 | PC4 | |
| 8 | Pentium II 450 MHz CPU and Heat Sink | — | — | — | 150 | 150 |
| 9 | Mother Board (PC1, PC2) | 51 | 44 | — | — | 95 |
| 10 | Mother Board (PC3, PC4) | — | — | 44 | 56 | 100 |
| 11 | Display and Sound Cards (PC1–PC4) | — | — | — | — | — |
| 12 | 4 GB Hard Drive | — | — | — | — | — |
| 13 | 9.1 GB Hard Drive | — | 47 | 93 | — | 140 |
| 14 | 12.6 GB Hard Dive | — | — | — | 100 | 100 |
| 15 | 1.44-MB Diskette Drive | 36 | 50 | 49 | 60 | 195 |
| 16 | 32× CD-ROM Drive (PC1–PC4) | — | — | — | — | — |
| 17 | Power Supply (PC1–PC4) | — | — | — | — | — |

Figure 2:
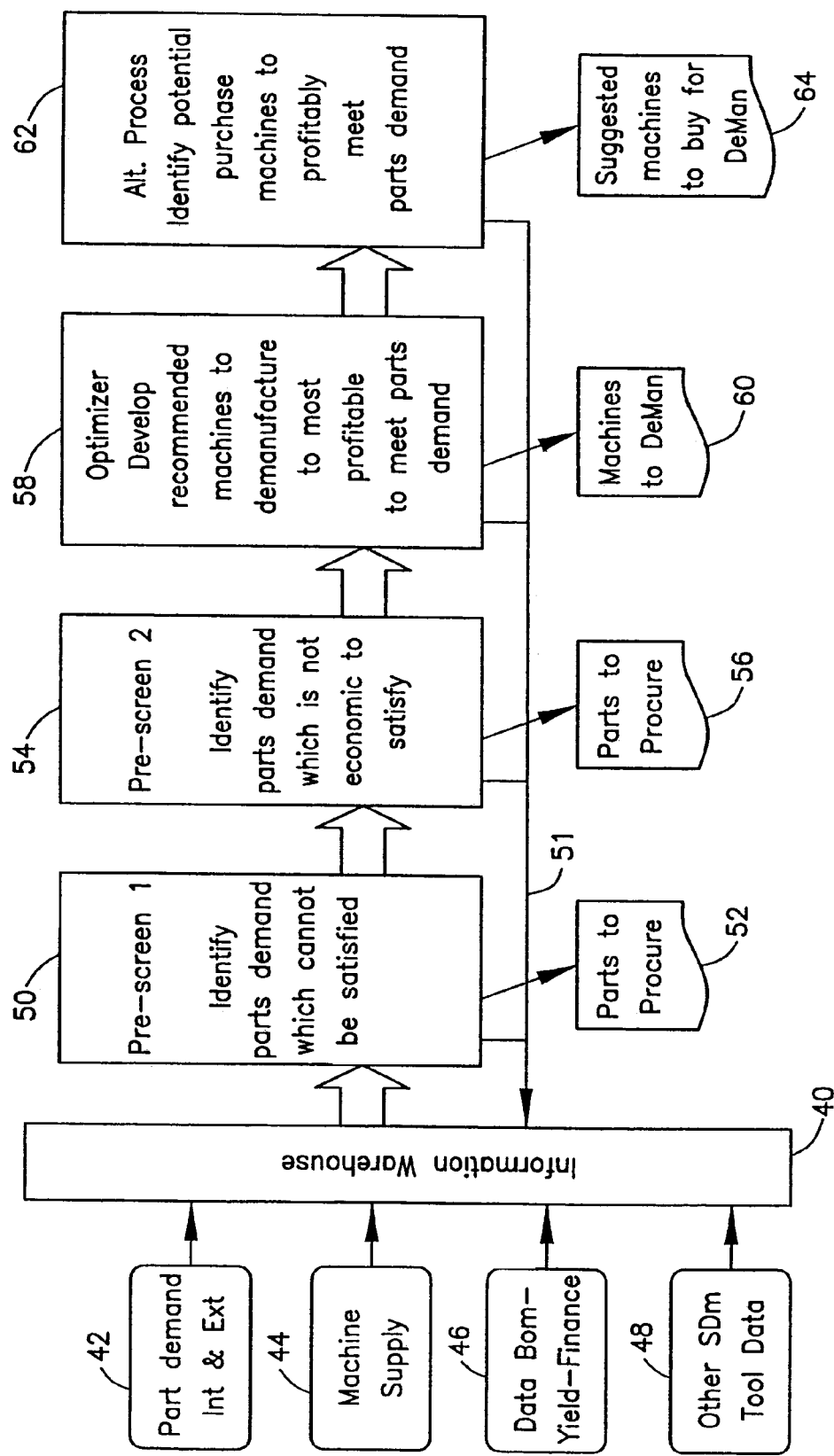
FIG. 2 shows a flowchart for the process of an optimization system according to a preferred embodiment of the present invention.

Now referring to FIG. 2, a high level data and processing flow is shown for a system according to a preferred embodiment of the invention. An information warehouse, or central data storage 40 stores all data necessary to determine the optimal dismantling configuration. Data for the anticipated, or actual demand for parts 42 is calculated for all sources of demand, both external and internal. Internal demands are those of the leasing operation. For example, a large computer manufacturer will fulfill the computing needs of its own operations with its own equipment, producing an internal demand. External demands are those that originate from the market for the particular parts. The available machine supply 44 is entered with the data on bill of machines (BOM), which outlines the parts yield of each machine with the cost of dismantling, and lastly, any other relevant supply-demand approximation tool data 48.

A first screening process (step 50) determines parts demands that cannot be satisfied with parts from the existing machine supply, i.e. demand for new parts or old parts that are not in the machine supply. The demands that cannot be met from dismantled machines produces a list of parts that must be procured 52. A second screening process (step 54) determines which parts demands, if any, are not economically feasible to satisfy with de-manufactured machines by some predetermined selection criteria, producing another group of parts that must be procured 56.

After determining the exact parts demand to satisfy from the existing machine supply, an optimization tool according to the present invention calculates the optimal dismantling configuration (step 58) to generate a list of machines to dismantle 60. The system also determines whether purchasing machines to dismantle will meet the parts demand at a lower cost to produce a greater profit than dismantling existing stock 62, generating a report of suggested machines to buy for dismantling 64.

The end result of each process is sent back (arrow 51) to the central data storage 40 to maintain central storage of all system information. It should be noted that the central storage 40 may reside in a single location, or may be distributed across multiple data storage devices, connected, for example, by a LAN or WAN.

FIG. 3 shows the data sources of the system according to a preferred embodiment of the invention. A process source owner (PSO) tool 70 keeps track of available parts inventory for a particular period and generates data on the demand for parts 42, originating from both external and internal sources, and the BOMs for available machines 72. Financial data for parts 74 and financial data for machines 76, such as de-manufacturing costs, profit yields, and fair market value, are stored in a central data storage location 40 with the demand data 42, and the BOM data 72 generated by the PSO process 70.

An optimization tool 80 works in conjunction with a supply-demand matching tool (SDM) 78. The SDM 78 generates forecasted demand data 86 for parts in specific geographical regions, as well as machine supply data 88 and stores that data in the central data storage 40 for access by other parts of the system. The optimization tool 80 uses the system data stored in the data warehouse 40 to calculate the optimal dismantling configuration of the machine supply 82. Examples of such calculations were discussed above with regard to tables 1-4. A report with a dismantling plan 84 outlining the configuration is generated and stored in the central data warehouse 40.

Figure 4A:
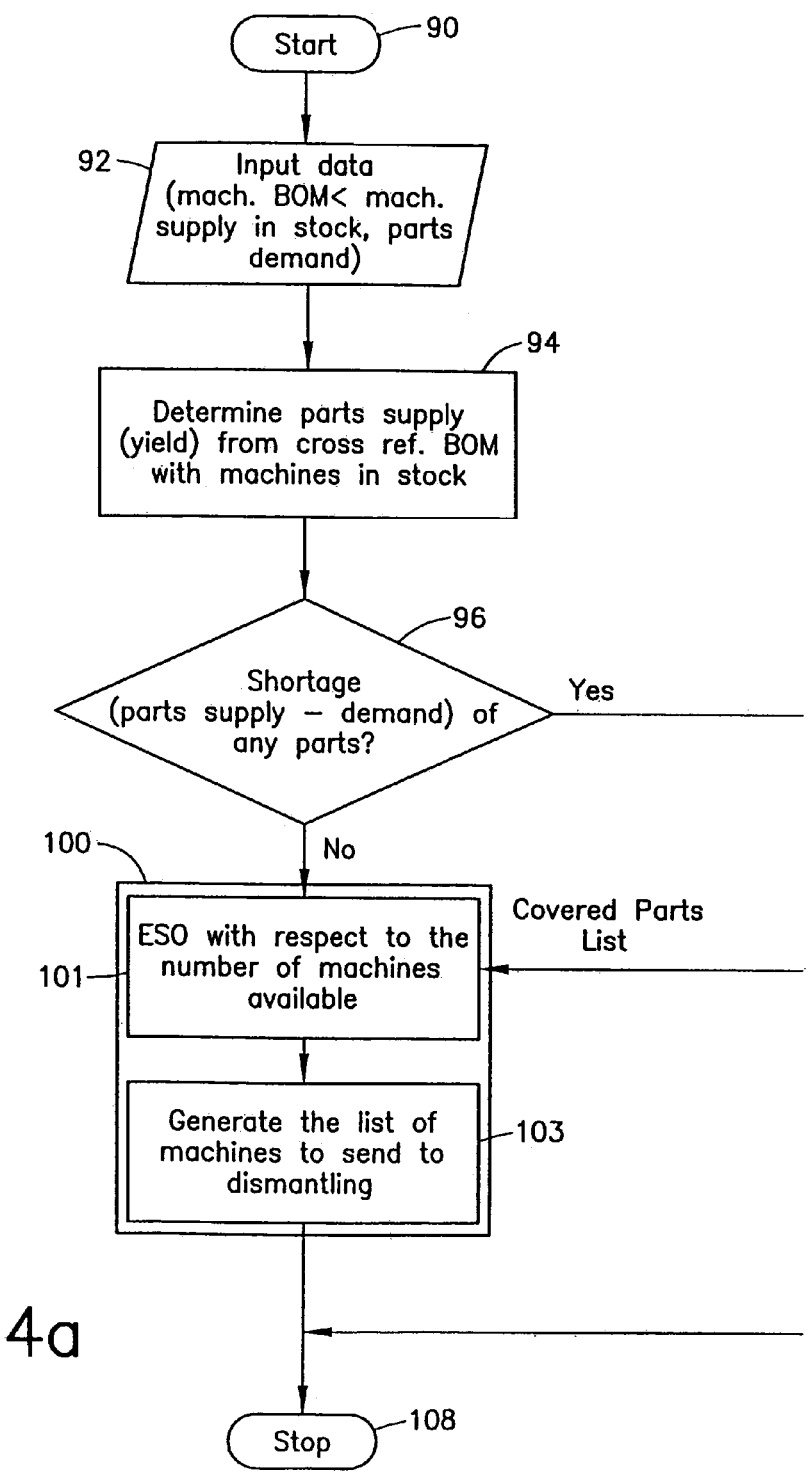
FIG. 4 depicts a flow chart for the logic flow of a preferred embodiment according to the present invention.
Figure 4B:
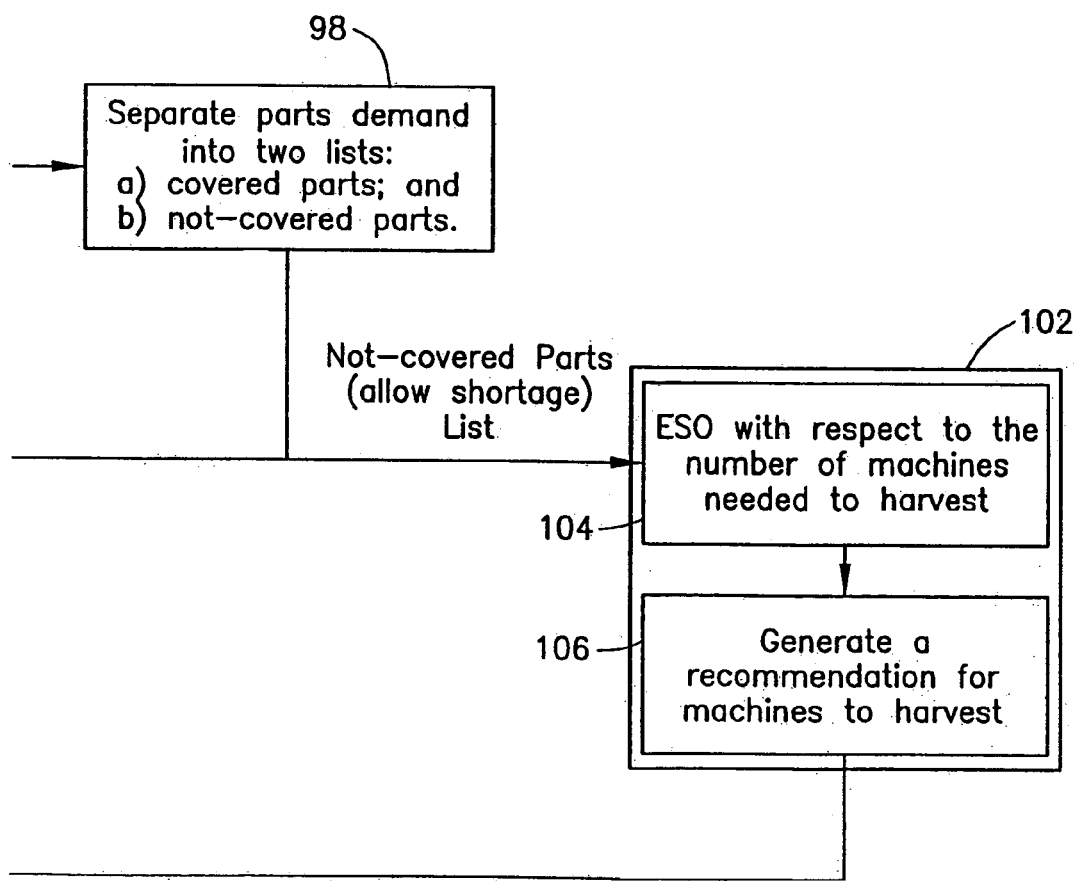

Now referring to FIG. 4, there is shown a simplified logic flow diagram according to a preferred embodiment of the present invention. The process is preferably implemented by software residing on a computer, as is well known. The process is invoked by some user or system request to the software (step 90). Data is entered or imported into the computer (step 92). This data includes all relevant financial and technical information on the machine supply and the parts demand, as previously discussed. Data to consider, for example, includes:

Machine parts BOM information with parts yield
Available machine inventory
Forecasted EOL machine returns
Calculated EOL propensity data (propensity of a machine to yield specific parts at its EOL based on historical data)
Parts FMV
Machines FMV
De-manufacturing cost data
De-manufacturing parts quality yield data (how many parts are produced from de-manufacturing and their condition based on historical data)
Defined machine to parts de-manufacturing financial equation algorithms, i.e., machine and parts profit calculation formulas
Machine type model option-able feature codes (percentage of machine types that yield certain options when returned at EOL based on historical data)
Quality level of machine inventory (whole, cannibalized, functional, cosmetic damage etc)
Machine de-manufacturing cycle times
Parts refurbishing cycle times
Cost of parts repair The parts supply is determined (step 94) by cross referencing the corresponding BOM with the machines in stock. In other words, the BOM contains the parts yield of each machine, i.e., what type and how many parts each machine produces from de-manufacturing. The parts yield of each machine is multiplied by the number of machines in stock to determine what type and quantity of parts are available. Next, it must be determined whether a shortage exists for any of the parts (step 96). If the available machine supply is sufficient to meet the demand for all parts, the optimization tool analyzes the machine supply data (step 101), a machine dismantling configuration is generated (step 103), and the process terminates (step 108).

If there is a shortage, the parts demand is separated into two lists: covered parts, or those covered by the parts supply, and not-covered parts, or those not covered by the parts supply (step 98). The covered parts list is processed to determine the optimal dismantling configuration (step 100). The not covered parts list is processed to determine a harvesting configuration of which machines and how many of each should be harvested (step 102), or obtained from another source outside the machine supply.

Because the not-covered parts list represents parts demand that is not covered by the machine supply, another source is considered for meeting the not-covered demand. One possible source is external suppliers. Another is leases that are almost at their end. The leasing entity contacts the lessees and offers to terminate their leases early to obtain leased equipment for meeting the not-covered parts demand. Preferably, a combination of the two sources is used which is optimized to the least cost.

Optimization is performed with respect to how many machines should be harvested (step 104) and a recommendation report is generated (step 106). After the report is generated, the process terminates (step 108). If there is an insufficient number of parts from dismantling, an order must be placed with external sources to fill the demand.

FIG. 5 depicts a data and logic flow of a preferred embodiment according to the present invention. The machine models that are economically justified for dismantling are selected (step 150) using the financial data on the value of the machines and their constituent parts together with the BOM for each machine model 152. When the BOM is cross referenced with the financial information about machine values and part values, profits from machine sales and parts sales can be determined by specific formulas, discussed later. If the profit from parts sales is greater than the profit from machine sales by a certain threshold for a particular model, that model is selected for dismantling.

A list of economically justified machine models for dismantling 154 is sent to the next process to determine the parts supply (step 156). Data on the machines currently in stock with their corresponding BOMs 158 is cross referenced with the list of models for dismantling 154 to determine the available parts supply from the machines in stock (step 156). The parts demand 162 is imported into the system and the parts supply 159 is matched to the parts demand (step 160) creating the covered parts demand 164 and the not-covered parts demand 166. The covered parts demand is further broken down into internal demand 168 and external demand 170. Optimization is run on all demand sets to determine the optimal dismantling configuration for meeting the parts demand at a lowest cost (step 172).

Figure 6A:
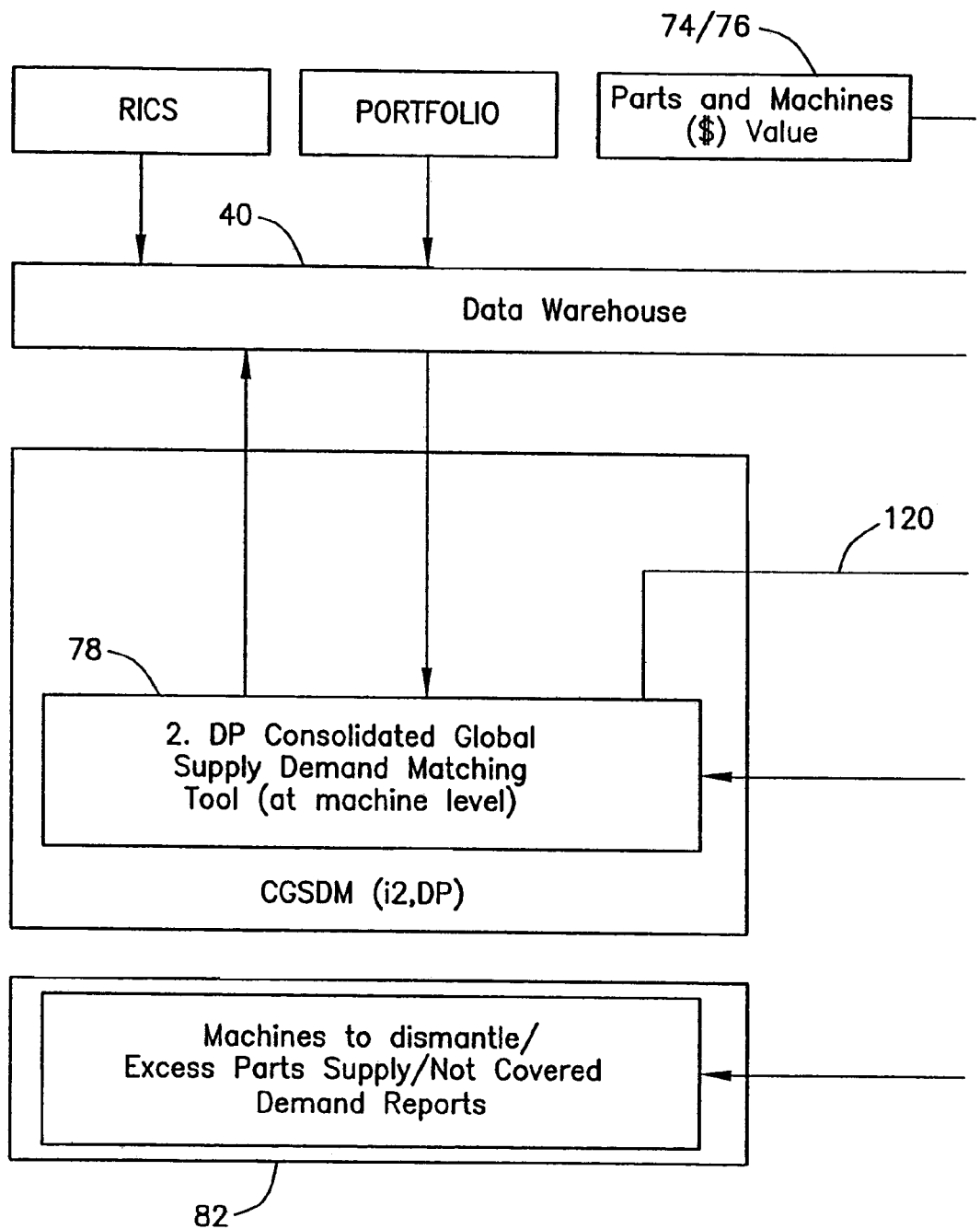
FIG. 6 is a more detailed diagram of the process in FIG. 5.
Figure 6B:
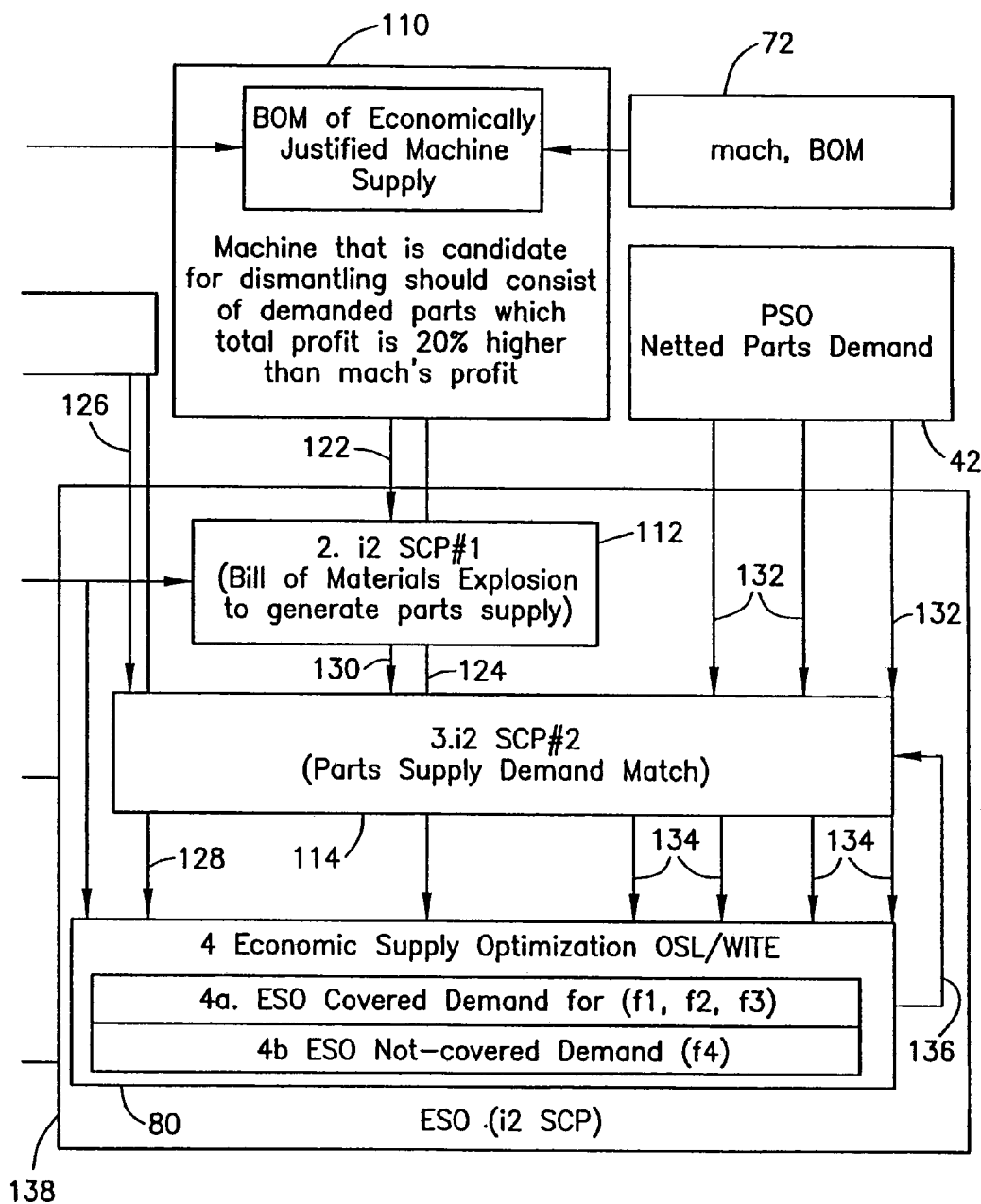

FIG. 6 shows a more detailed flowchart for the data flow and processing in a preferred embodiment according to the present invention. This flowchart illustrates how bills of parts demand are translated into bills of machine-to-dismantle while optimizing the number of machine-to-dismantle to incur the least cost.

The method starts with the determination of which machine models are economically justified for dismantling (step 110) by considering parts and machine value 74, 76 and the BOM of each machine model 72. The financial data utilized by the system tool includes valuation information about the machines and the parts such as average wholesale fair market value (FMV) for each machine type model (MTM), average profits for each MTM, the total average cost of re-manufacturing by MTM and the total average cost of de-manufacturing by MTM.

Using the value of the machines and the values of their individual parts, the profit yield for the machine type is determined when sold as a whole and when sold as parts. In determining whether a machine is economically justified for dismantling, the parts profit (profit from selling a machine for its parts) and the machine profit (profit from selling the machine as a whole) are calculated so that a final determination can be made as to whether the parts profit is greater than the machine profit by some margin. The margin is a design choice governed by business and economic concerns with the aim of maximizing profits. The actual margin will vary with different industries, corporate policies and personal preferences. Additionally, the margin may differ for selecting machines to meet external need against selecting machines to meet internal need.

In an exemplary embodiment, to meet external need, the profit yield of selling a machine for its parts should be twenty percent (20%) greater than the profit yield from selling the machine as a whole. In other words, if breaking a particular machine model down and selling it for parts would produce a 20% greater profit than selling the machine as a whole, then it is selected for dismantling to meet external need. Machines that do not meet this requirement are eliminated from the available machine supply. This process (step 110) generates a list of machines for dismantling, their BOMs, and the fair market value of the machines and their parts.

For purposes of illustration we will assume that, for some internal corporate policy of the leasing entity, it is preferable to meet internal need with machines whose parts profit are merely greater than their machine profit.

Machine profits and parts profits are calculated by predetermined formulas configured to take into account a number of factors reflecting business concerns and economic concerns of the leasing entity. The formulas will vary between different industries, corporations and businesses.

To select machines for de-manufacturing to meet external need the following formulas can be used. To calculate machine profits for a specific MTM, the average NIB value of an MTM is added to the total re-manufacturing expense for that specific machine type. That sum is then subtracted from the average FMV for that specific machine type model. In formula form, this is represented by:

MTM Machine Profit (MP)=(FMV)−((MTM avg.NIB value)+(total machine re-manufacturing expense))

To calculate the parts profit for a particular MTM to meet external need, the average machine NIB value is added to the total parts de-manufacturing expense and this sum subtracted from the average FMV of the MTM total valued parts with an external demand. This is represented by the formula:

MTM Parts Profits (PP)=((MTM total parts w/ext. demand avg. FMV)−((machine avg. NIB value)+(total parts de-man expense)

Using the results of this formula, machines that satisfy the following condition:

(PP+20%)>MP are selected for dismantling to meet external parts demand.

When selecting machines to meet internal parts demand, parts profit of a particular type of machine in the machine supply are calculated by adding the machine average net investment book (NIB) value to the total parts de-manufacturing expense and subtracting it from the sum of the average NIB value of the total parts with an internal demand with an adjustment to the NIB to take internal transfer costs into account. The corresponding formula follows:

MTM Parts Profit (PP)=(total parts w/internal demands avg. NIB value+cost adj to NIB)–((machine avg. NIB value)+(total parts de-man expense))

Machine profits for a particular model type to meet internal demand are calculated by adding the MTM average NIB value to the total machine re-manufacturing expense and subtracting the total from the average FMV of the particular machine type model. Or, in formula form:

MTM Machine Profits (MP)=(MTM avg.FMV)–((MTM avg. NIB value)+(total machine re-man expense))

Accordingly, to be dismantled for internal parts demand, the parts profit of a machine should be greater than its machine profit, or:

PP>MP

Alternatively, machines with a net parts revenue (NPR) greater than its gross machine revenue (GMR) can be selected for dismantling for both external and internal demands. The NPR is determined by subtracting the total de-manufacturing expense from the total valued parts, or:

NPR=MTM total valued parts–total parts de-manufacturing expense

In any event, once the set of economically justified machines is determined, its corresponding parts supply list is calculated from the list of machines for dismantling in part one of a supply chain planner (SCP) process (step 112) by exploding the BOM, i.e., cross referencing the BOM of the available machines with the list of machines for dismantling to determine which parts and how many of each part will be available. It is preferred that a two-level BOM is used for each machine model type which includes a list of high-value parts and the corresponding quantity per machine for that type. The two-level BOM is arranged in a tree structure with the first level being the highest level indicative of a whole machine. The second level is the lower level indicative of the constituent parts that make up the whole machine.

The SCP #1 process (step 112) uses information from a supply demand matching (SDM) tool (step 78), which includes the quantity of machines available in the machine supply to dismantle, for generating a list of parts and the quantity of each part for the second part of the SCP process (step 114).

The second part of the SCP process (step 114) matches parts supply against their demand. The SCP #2 process accepts data from the central data storage 40 and the PSO 42 which produces netted parts demand information (demand from all sources).

The SCP #2 (step 114) generates the covered parts list and the not-covered parts list for the optimization tool (step 80). Reports are generated outlining the machines to dismantle, excess parts supply, and the parts demand that is not covered by the supply (not-covered parts demand).

The system optimizes each set of the parts demand, the covered internal parts demand, the covered external parts demand, and the not-covered parts demand. When run on the covered parts demand, the system produces the set of machines to dismantle for that covered parts demand set and the set of left over excess parts, for which there is no demand. The excess parts are fed back into SCP #2 to be matched with some other demand. When the system runs on the not-covered parts demand, a recommendation for harvesting machines is generated.

The resultant reports, including the list of machines-to-dismantle 82, will be sent to the SDM tool 78. Other reports include the not-covered demands report, uneconomical to cover demands report, surplus report (excess parts supply from de-manufacturing for which there is no demand), and list of machines for harvesting the not-covered parts report.

The flow of data in the diagram of FIG. 6 will now be described. The total number of available machines in stock is determined by the SDM tool 78 and sent to SCP #1 112 and the optimization tool 80 (arrow 120). The list of products economically justified for dismantling, their corresponding BOM, and the value for the machines and parts is also exported to the SCP #1 112 and the optimization tool 80 (arrows 122 and 124). Reference data from the central data storage 40 such as machine information and parts information is transmitted to the SCP #2 114 and the optimization tool 80 (arrows 126 and 128). The list of all available parts supply and the total quantity of each part that is generated by the SCP #1 is sent to SCP #2 114 for further processing as previously discussed (arrow 130). Parts demand information processed by the optimization tool 80 is obtained from the PSO 42 (arrows 132). The PSO process supplies the demand files to the system via the central data storage 40. The files include information on the parts demand, the parts and the machines. Machine information includes a BOM file by machine type model (MTM) with de-manufacturing yield data. Parts demand data includes part number, description, quantity required, need by date, demand source and any other part information deemed important. Machine supply data includes the machine type model, model number and the quantity available. Parts demand data generated by the SCP #2 114 for all the sets of parts demands (covered, not-covered, internal, external) is imported into the optimization tool 80 (arrows 134). A report outlining the virtual excess parts generated from machine dismantling is fed back to SCP #2 114 as buffered inventory (arrow 136) so that the inventory will accumulate, virtually, excess parts from dismantled machines that are not needed to meet demand. Preferably, virtual excess parts left over from external demand are available to internal demand consumption and virtual excess parts from any discontinued machines or parts are available to internal and external demand. The optimization tool 80 produces, as output, a set of flat files containing the list of machines to dismantle 82 that is exported to the SDM tool 78 and output to a user (arrow 138).

Optimization may be adapted to address specific concerns, such as high-valued parts. In such a case, when configuring the supply-demand sources to optimize, only high-valued parts are included. The same can be done for low-valued parts.

In a further embodiment, a virtual parts supply driven model is provided that electronically converts machine supply to a virtual part supply. The objective of this embodiment is to convert a given machine supply forecast into an available parts supply forecast, or virtual parts supply. This can be done for the entire machine supply or segments of the machine supply, such as excess machines that have no external demands, but still retain an internal reserve or residual value. The system turns the total machine supply into a virtual parts supply by the machine model numbers. The virtual supply can be used to forecast parts supply over time and to perform optimization analysis for long term materials requirement planning, parts supply demand planning, and forecasting.

Alternatively, the virtual supply embodiment can be used to support advanced advertising of a forecasted parts supply that the system predetermines would produce the most profit, providing an effective planning tool for marketing strategies.

What is claimed is:

1. A computer-implemented method for optimizing a supply to meet a demand, said method comprising:
    determining a parts demand, wherein the determined parts demand further comprises an internal and external demand;
    determining a machine supply, wherein said machine supply comprises in-stock machines;
    maintaining a database of machine supply information, wherein said machine supply information comprises:
        a record of different machine types in said machine supply;
        a number of said different machine types in said machine supply;
        a set of part types in each one of said different machine types;
        a corresponding monetary value for each part type;
        a number of each part type in each one of said different machine types;
        refurbishing cycle times for said each part type;
        repair costs for said each part type; and
        at least one of forecasted end of lease machine returns, propensities of said different machine types to yield specific parts at lease end, percentages of said different machine types which yield certain options when returned to stock at said lease end, and defined machine-to-parts de-manufacturing profit calculations; and
    configuring an optimal dismantling configuration to meet the said parts demand as a function of said machine supply information, wherein said configuring comprises:
        generating and outputting a list of said in-stock machines from said machine supply to dismantle such that a cost of meeting said parts demand is minimized;
        determining whether additional machines should be purchased for dismantling in order to meet said parts demand at a lower cost than dismantling said in-stock machines on said list; and
        generating a report of suggested additional machines to purchase for dismantling.

2. The method of claim 1 further comprising determining at least a portion of the parts demand that cannot be satisfied from the machine supply.

3. The method of claim 1 further comprising determining at least a portion of the machine supply that is not economically justified for dismantling.

4. The method of claim 3 wherein the determining at least a portion of the machine supply that is not economically justified for dismantling further comprises determining whether parts profit of a particular machine type is a predetermined percentage greater than machine profit of a particular machine type.

5. The method of claim 4 further comprising determining parts profit by adding an average machine net investment book value to a total parts de-manufacturing expense to produce a sum, and subtracting the sum from a total valued parts with external demands average fair market value.

6. The method of claim 4 further comprising determining machine profit by adding the average net investment book value of the particular machine type to a total re-manufacturing expense for the particular machine type to produce a sum, and subtracting the sum from an average fair market value for the particular machine type.

7. The method of claim 3 wherein the determining at least a portion of the machine supply that is not economically justified for dismantling further comprises determining whether parts profit of a particular machine is greater than machine profit of the particular machine.

8. The method of claim 7 wherein the parts profit is determined by adding a machine average net investment book value to a total parts de-manufacturing expense to produce a sum, and subtracting the sum from a book value, the book value equal to the total parts with internal demands average net investment book value with a cost adjustment of the net investment book value.

9. The method of claim 7 wherein the machine profit is determined by adding the particular machine type average net investment book value to a total machine re-manufacturing expense to produce a sum, and subtracting the sum from an average fair adjustment to the net investment book value.

10. The method of claim 1 further comprising: determining a corresponding parts supply from the machine supply; and, matching the corresponding parts supply to the parts demand.

11. The method of claim 10 wherein the determining a corresponding parts supply further comprises the steps of; determining the part types in a particular machine type; determining the number of each of the part types in a particular machine type; and, multiplying the number of each of the part types in a particular machine type by the number of machines for the particular machine type in the machine supply.

12. The method of claim 10 further comprising: generating a covered parts list and a not-covered parts list if the part supply is less than the parts demand; and, wherein the configuring step comprises; determining the optimal dismantling configuration of the machines in the covered parts list; and, determining the optimal dismantling configuration of machines to harvest from the not-covered list.

13. The method of claim 12 wherein the covered parts list is divided into an internal and an external list.

14. The method of claim 1 wherein the optimal dismantling configuration is determined by linear programming.

15. The method of claim 1 wherein the optimal dismantling configuration is determined by maximizing a summation formula for revenue considering a number of factors for a part j and a machine i.

16. The method of claim 15 wherein the factors are: revenue from parts j sales ($RV_j$); net investment cost of machine ($TC_i$); processing cost of de-manufacturing machine i ($PC_i$); total supply of machine i ($S_i$) netted demand of part j ($D_j$); parts not utilized ($W_{ij}$); parts fulfillment ($X_{ij}$); machines required to fulfill the desired parts ($Y_i$).

17. The method of claim 16 wherein the summation formula is $$\sum_i \sum_j (RV_j \cdot \{X_{ij}\}) - \sum_i (TC_i \cdot \{Y_i\}) - \sum_i (PC_i \cdot \{Y_i\})$$

where
- $RV_j$=revenue sales from part j sales;
- $TCI$=net investment balance (cost) of machine i;
- $PC_i$=processing cost of de-manufacturing machine i; and
- $Y_i$=machines required to fulfill the desired parts.

18. The method of claim 1 wherein the machine supply information further comprises a forecast of machines expected to be available at a predetermined time.

19. The method of claim 1 wherein the machine supply information further comprises an estimated number of parts for each of the part types in each of the machine types.

20. The method of claim 1 wherein the machine supply information further comprises fair market value of the part types and fair market value of the machine types.

21. The method of claim 1 wherein the machine supply information further comprises costs of de-manufacturing a specific machine type.

22. The method of claim 1 wherein the machine supply information further comprises data on the quality of parts yielded from de-manufacturing a specific machine type.

23. The method of claim 1 wherein the machine supply information further comprises codes for options on each of the machine types.

24. The method of claim 1 wherein the machine supply information further comprises quality of each of the machine types.

25. The method of claim 1 wherein the machine supply information further comprises time for de-manufacturing cycles of a particular machine type.

26. An economic supply optimization system comprising:
   a processor;
   a data storage device operably connected to said processor, wherein said data storage device is adapted to provide data storage for said system; and
   a database of machine supply information on said data storage device, wherein said machine supply information comprises:
      a record of different machine types in a machine supply, wherein said machine supply comprises in-stock machines;
      a number of said different machine types in said machine supply;
      a set of part types in each one of said different machine types;
      a corresponding monetary value for each part type;
      a number of each part type in each one of said different machine types;
      refurbishing cycle times for said each part type;
      repair costs for said each part type; and
      at least one of forecasted end of lease machine returns, propensities of said different machine types to yield specific parts at lease end, percentages of said different machine types which yield certain options when returned to stock at said lease end, and defined machine-to-parts de-manufacturing profit calculations; and
   a program executable by said processor to:
      determine a machine supply, wherein said machine supply comprises in-stock machines;
      determine a parts demand, wherein the determined parts demand further comprises an internal and external demand;
      configure an optimal dismantling configuration to meet the said parts demand as a function of said machine supply information in order to generate and output a list of said in-stock machines from said machine supply to dismantle such that a cost of meeting said parts demand is minimized, wherein said program is further executable to determine whether additional machines should be purchased for dismantling in order to meet said parts demand at a lower cost than dismantling said in-stock machines on said list and to generate a report of suggested additional machines to purchase for dismantling.

27. The system of claim 26 wherein the program is further executable to determine at least a portion of the parts demand that cannot be satisfied from the machine supply.

28. The system of claim 26 wherein the program is further executable to determine at least a portion of the machine supply that is not economically justified for dismantling.

29. The system of claim 28 wherein the economic justification further comprises parts profit of a particular machine type being a predetermined percentage greater than machine profit of a particular machine type.

30. The system of claim 29 wherein the parts profit is determined by adding an average machine net investment book value to a total parts de-manufacturing expense to produce a sum, and subtracting the sum from a total valued parts with external demands average fair market value.

31. The system of claim 29 wherein the machine profit is determined by adding the average net investment book value of the particular machine type to the total re-manufacturing expense for the particular machine type to produce a sum, and subtracting the sum from an average fair market value for the particular machine type.

32. The system of claim 28 wherein the economic justification further comprises parts profit of a particular machine being greater than machine profit of the particular machine.

33. The system of claim 32 herein the parts profit is determined by adding a machine average net investment book value to a total parts de-manufacturing expense to produce a sum, and subtracting the sum from a book value, the book value equal to a total parts with internal demands average net investment book value with a cost adjustment to the net investment book value.

34. The system of claim 32 wherein the machine profit is determined by adding the particular machine type average net investment book value to a total machine re-manufacturing expense to produce a sum, and subtracting the sum from an average fair market value of the particular machine type model.

35. The system of claim 26 wherein the program is further executable to:
   determine a corresponding parts supply from the machine supply; and, to match the corresponding part supply to the parts demand.

36. The system of claim 35 wherein the program is further executable to determine the corresponding parts supply by: determining the part types in a particular machine type; determining the number of each of the part types in a particular machine type; and, multiplying the number of each of the part types in a particular machine type by the number of machines for the particular machine type in the machine supply.

37. The system of claim 35 wherein the program is further executable to:
  generate a covered parts list and a not-covered parts list if the parts supply is less than the parts demand, and to configure the optimal dismantling configuration by:
    determining the optimal dismantling configuration of the machines in the covered parts list; and,
    determining the optimal dismantling configuration of machines to harvest from the not-covered list.

38. The system of claim 37 wherein the covered parts list is divided into an internal and an external list.

39. The system of claim 26 wherein the optimal dismantling configuration is determined by linear programming.

40. The system of claim 26 wherein the optimal dismantling configuration is determined by maximizing a summation formula for revenue considering a number of factors for a part j and a machine i.

41. The system of claim 40 wherein the factors are: revenue from parts j sales (RV.sub.j); net investment cost of machine (TC.sub.i); processing cost of de-manufacturing machine i (PCsub.i); total supply of machine i (S.sub.i); netted demand of part j (D.sub.j); parts not utilized (W.sub.ij); parts fulfillment (X.sub.ij); machines required to fulfill the desired parts (Y.sub.i).

42. The system of claim 41 wherein the summation formula is $$\sum_i \sum_j (RV_j \cdot \{X_{ij}\}) - \sum_i (TC_i \cdot \{Y_i\}) - \sum_i (PC_i \cdot \{Y_i\})$$

where
  RVj=revenue sales from part j sales;
  TCi=net investment balance (cost) of machine i;
  PCi=processing cost of de-manufacturing machine i; and
  Yi=machines required to fulfill the desired parts.

43. The system of claim 26 wherein the machine supply information further comprises the number of parts for each of the part types in each of the machine types.

44. The system of claim 26 wherein the machine supply information further comprises a forecast of machines expected to be available at a predetermined time.

45. The system of claim 26 wherein the machine supply information further comprises fair market value of the parts and fair market value of each of the machine types.

46. The system of claim 26 wherein the machine supply information further comprises costs of de-manufacturing a specific machine type.

47. The system of claim 26 wherein the machine supply information further comprises data on the quality of parts yielded from de-manufacturing a specific machine type.

48. The system of claim 26 wherein the machine supply information further comprises codes for options on each of the machine types.

49. The system of claim 26 wherein the machine supply information further comprises quality of each of the machine types.

50. The system of claim 26 wherein the machine supply information further comprises de-manufacturing cycles of a particular machine type.

51. A program storage device readable by computer and tangibly embodying a program of instructions executable by said computer to perform a method for optimizing a supply to meet a demand, said method comprising:
  determining parts demand, wherein the determined parts demand further comprises an internal and external demand;
  determining a machine supply, wherein said machine supply comprises in-stock machines;
  maintaining a database of machine supply information, wherein said machine supply information comprises:
    a record of different machine types in said machine supply;
    a number of said different machine types in said machine supply;
    a set of part types in each one of said different machine types;
    a corresponding monetary value for each part type;
    a number of each part type in each one of said different machine types;
    refurbishing cycle times for said each part type;
    repair costs for said each part type; and
    at least one of forecasted end of lease machine returns, propensities of said different machine types to yield specific parts at lease end, percentages of said different machine types which yield certain options when returned to stock at said lease end, and defined machine-to-parts de-manufacturing profit calculations; and
  configuring an optimal dismantling configuration to meet the said parts demand as a function of said machine supply information, wherein said configuring comprises:
    generating and outputting a list of said in-stock machines from said machine supply to dismantle such that a cost of meeting said parts demand is minimized;
    determining whether additional machines should be purchased for dismantling in order to meet said parts demand at a lower cost than dismantling said in-stock machines on said list; and
    generating a report of suggested additional machines to purchase for dismantling.

52. The program storage device of claim 51, wherein said method further comprises determining at least a portion of the parts demand that cannot be satisfied from the machine supply.

53. The program storage device of claim 51, wherein said method further comprises determining at least a portion of the machine supply that is not economically justified for dismantling.

54. The program storage device of claim 53 wherein the economic justification further comprises parts profit of a particular machine type being a predetermined percentage greater than machine profit of a particular machine type.

55. The program storage device of claim 54 wherein the parts profit is determined by adding an average machine net investment book value to a total parts de-manufacturing expense to produce a sum, and subtracting the sum from a total valued parts with external demands average fair market value.

56. The program storage device of claim 54 wherein the machine profit is determined by adding the average net investment book value of the particular machine type to the total re-manufacturing expense for the particular machine type to produce a sum, and subtracting the sum from an average fair market value for the particular machine type.

57. The program storage device of claim 53 wherein the economic justification further comprises parts profit of a particular machine being greater than machine profit of the particular machine.

58. The program storage device of claim 57 wherein the parts profit is determined by adding a machine average net investment book value to a total parts de-manufacturing expense to produce a sum, and subtracting the sum from a book value, the book value equal to a total parts with internal demands average net investment book value with a cost adjustment to the net investment book value.

59. The program storage device of claim 57 wherein the machine profit is determined by adding the particular machine type average net investment book value to a total machine re-manufacturing expense to produce a sum, and subtracting the sum from an average fair market value of the particular machine type model.

60. The program storage device of claim 51 wherein said method further comprises determining a corresponding parts supply from the machine supply; and, matching the corresponding part supply to the parts demand.

61. The program storage device of claim 60 wherein said method further comprises: determining the corresponding parts supply by determining the part types in a particular machine type; determining the number of each of the part types in a particular machine type; and, multiplying the number of each of the part types in a particular machine type by the number of machines for the particular machine type in the machine supply.

62. The program storage device of claim 61 wherein said method further comprises generating a covered parts list and a not-covered parts list if the parts supply is less than the parts demand, and configuring the optimal dismantling configuration by:
determining the optimal dismantling configuration of the machines in the covered parts list; and, determining the optimal dismantling configuration of machines to harvest from the not-covered list.

63. The program storage device of claim 62 wherein the covered parts list is divided into an internal and an external list.

64. The program storage device of claim 51 wherein the optimal dismantling configuration is determined by linear programming.

65. The program storage device computer executable process steps of claim 51 wherein the optimal dismantling configuration is determined by maximizing a summation formula for revenue considering a number of factors for a part j and a machine i.

66. The program storage device of claim 65 wherein the factors are:
revenue from parts j sales ($RV_{.j}$); net investment cost of machine ($TC_{.i}$); processing cost of de-manufacturing machine i ($PC_{sub.i}$); total supply of machine i ($S_{.sub.i}$); netted demand of part j ($p_{.sub.j}$); parts not utilized ($W_{.sub.ij}$); parts fulfillment ($X_{.sub.ij}$); machines required to fulfill the desired parts ($Y_{.sub.i}$).

67. The program storage device of claim 66 wherein the summation formula is $$\sum_i \sum_j (RV_j \cdot \{X_{ij}\}) - \sum_i (TC_i \cdot \{Y_i\}) - \sum_i (PC_i \cdot \{Y_i\})$$

where
$RV_j$=revenue sales from part j sales;
$TC_i$=net investment balance (cost) of machine i;
$PC_i$=processing cost of de-manufacturing machine i; and
$Y_i$=machines required to fulfill the desired parts.

68. The program storage device of claim 51 wherein the machine supply information further comprises the number of parts for each of the part types in each of the machine types.

69. The program storage device of claim 51 wherein the machine supply information further comprises a forecast of machines expected to be available at a predetermined time.

70. The program storage device of claim 51 wherein the machine supply information further comprises data on the quality of parts yielded from de-manufacturing a specific machine type.

71. The program storage device of claim 51 wherein the machine supply information further comprises costs of de-manufacturing a specific machine type.

72. The program storage device of claim 51 wherein the machine supply information further comprises fair market value of the part types and fair market value of the machine types.

73. The program storage device of claim 51 wherein the machine supply information further comprises data on the quality of parts yielded from de-manufacturing a specific machine type.

74. The program storage device of claim 51 wherein the machine supply information further comprises codes for options on each of the machine types.

75. The program storage device of claim 51 wherein the machine supply information further comprises quality of each of the machine types.

76. The program storage device of claim 51 wherein the machine supply information further comprise times for de-manufacturing cycles of a particular machine type.

* * * * *